Dec. 31, 1929.  A. R. ULSTROM  1,741,170
ELECTRICAL CONTROL SYSTEM
Filed June 27, 1927  5 Sheets-Sheet 3

Inventor:
Alger R. Ulstrom.
By Whiteley and
Ruckman
Attorneys.

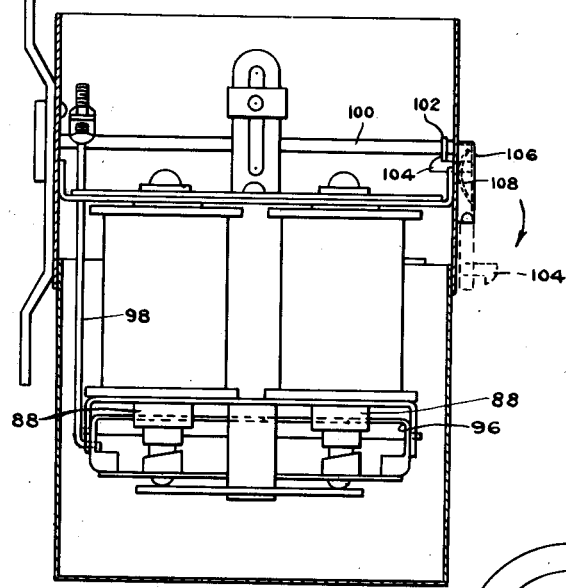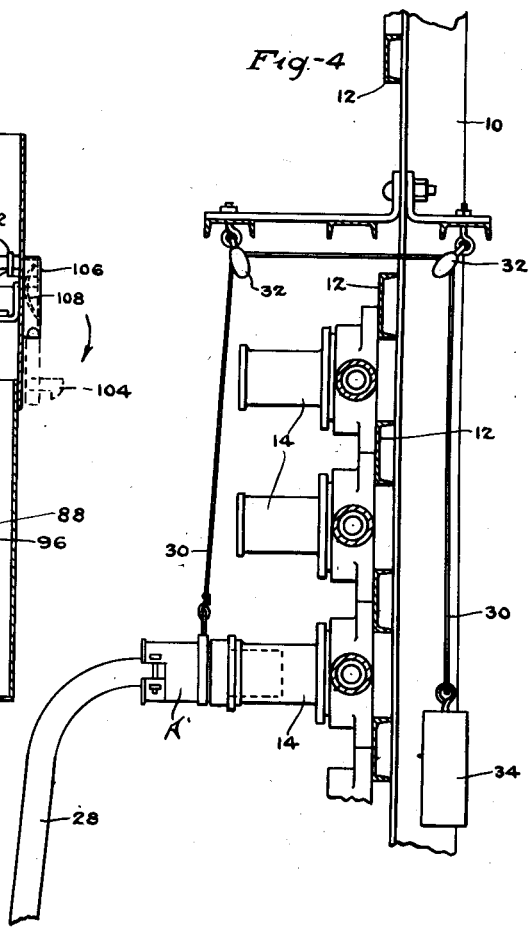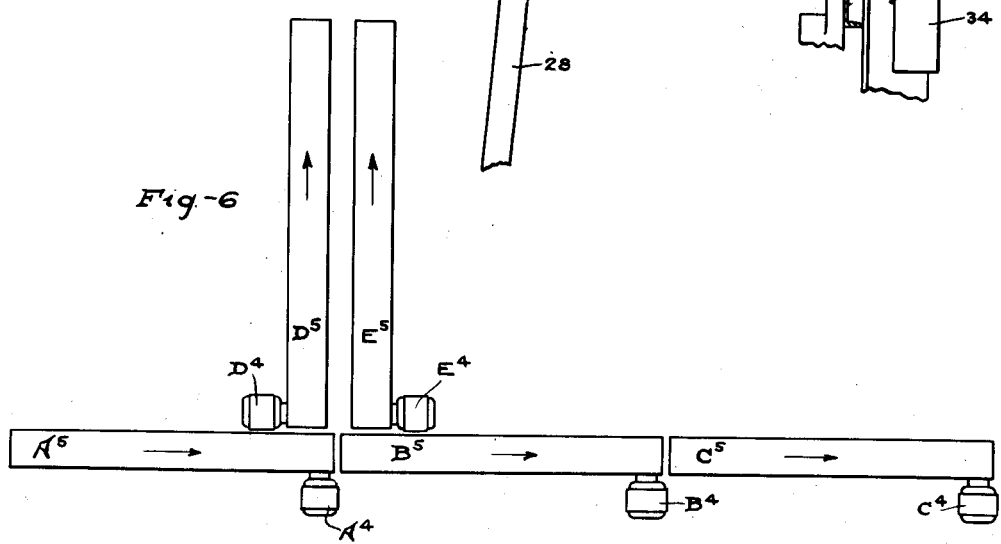

Dec. 31, 1929.                A. R. ULSTROM                1,741,170
                         ELECTRICAL CONTROL SYSTEM
                          Filed June 27, 1927        5 Sheets-Sheet 5

Inventor:
Alger R. Ulstrom
By
Whiteley
and
Ruckman
Attorneys.

Patented Dec. 31, 1929

1,741,170

UNITED STATES PATENT OFFICE

ALGER R. ULSTROM, OF MINNEAPOLIS, MINNESOTA, ASSIGNOR, BY MESNE ASSIGNMENTS, TO GENERAL MILLS, INC., A CORPORATION OF DELAWARE

ELECTRICAL CONTROL SYSTEM

Application filed June 27, 1927. Serial No. 201,696.

My invention relates to electrical control systems. An object is to provide a system including a switch board for selectively controlling the operation of a plurality of electrically driven conveyors or other mechanisms in such manner that all of the mechanisms may each be started and stopped independently, or all of them may be started and stopped dependently or simultaneously, or various groupings of the mechanisms may be made so that all mechanisms of a group may be started and stopped dependently without interfering with the running of the other groups. In the last mentioned case, it will be understood that one or more of the groups may include one mechanism only. Another object is to provide means whereby in case one of the motors employed for driving the mechanisms should become overloaded due to jamming, mechanical defects, breaking down of insulation on the motor, or from other causes, such motor will be automatically stopped. In connection with the last statement, it is to be understood that when two or more of the mechanisms are grouped together so as to operate as a unit, provision is made for simultaneously stopping all of the motors employed in that particular group without interfering with the running of any of the mechanisms not included in the group. Another object is to provide indicators for all of the motors for the purpose of indicating which motor had become overloaded.

The full objects and advantages of my invention will appear in connection with the detailed description thereof; and the novel features embodied in my inventive idea will be particularly pointed out in the claims.

In the accompanying drawings which illustrate one form in which my invention may be embodied,—

Figure 1:
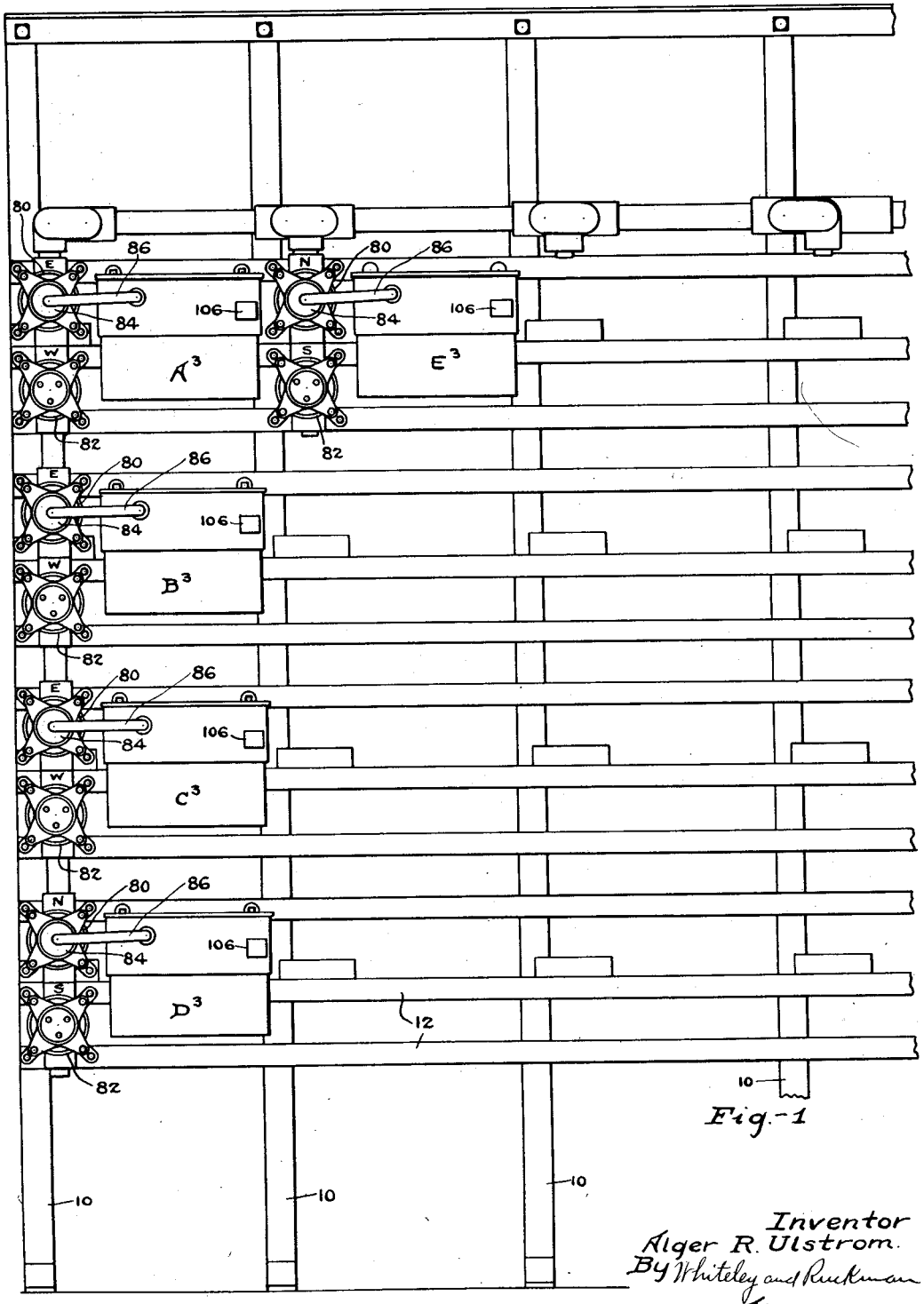
Figure 2:
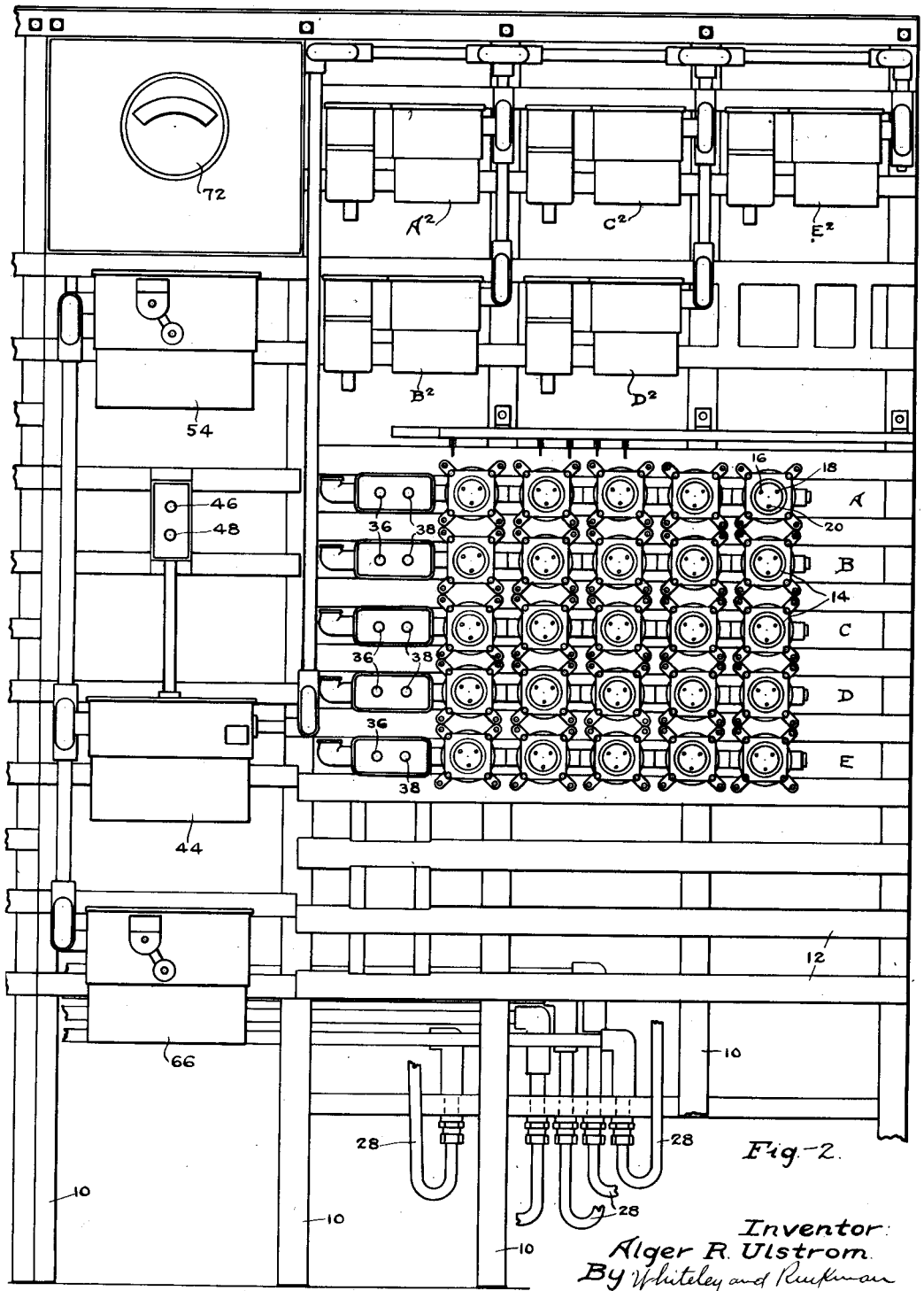
Figure 3:
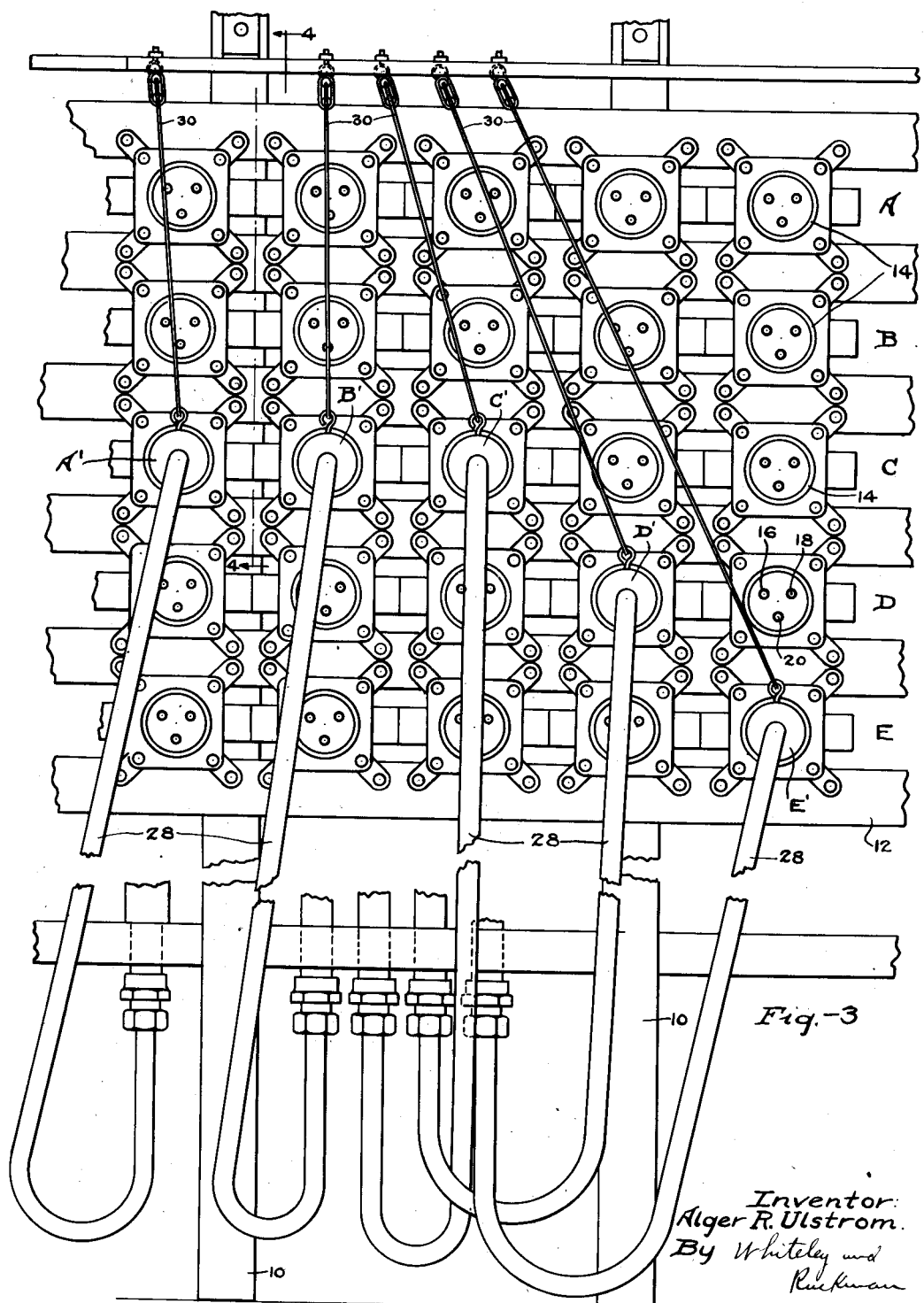
Figure 7:
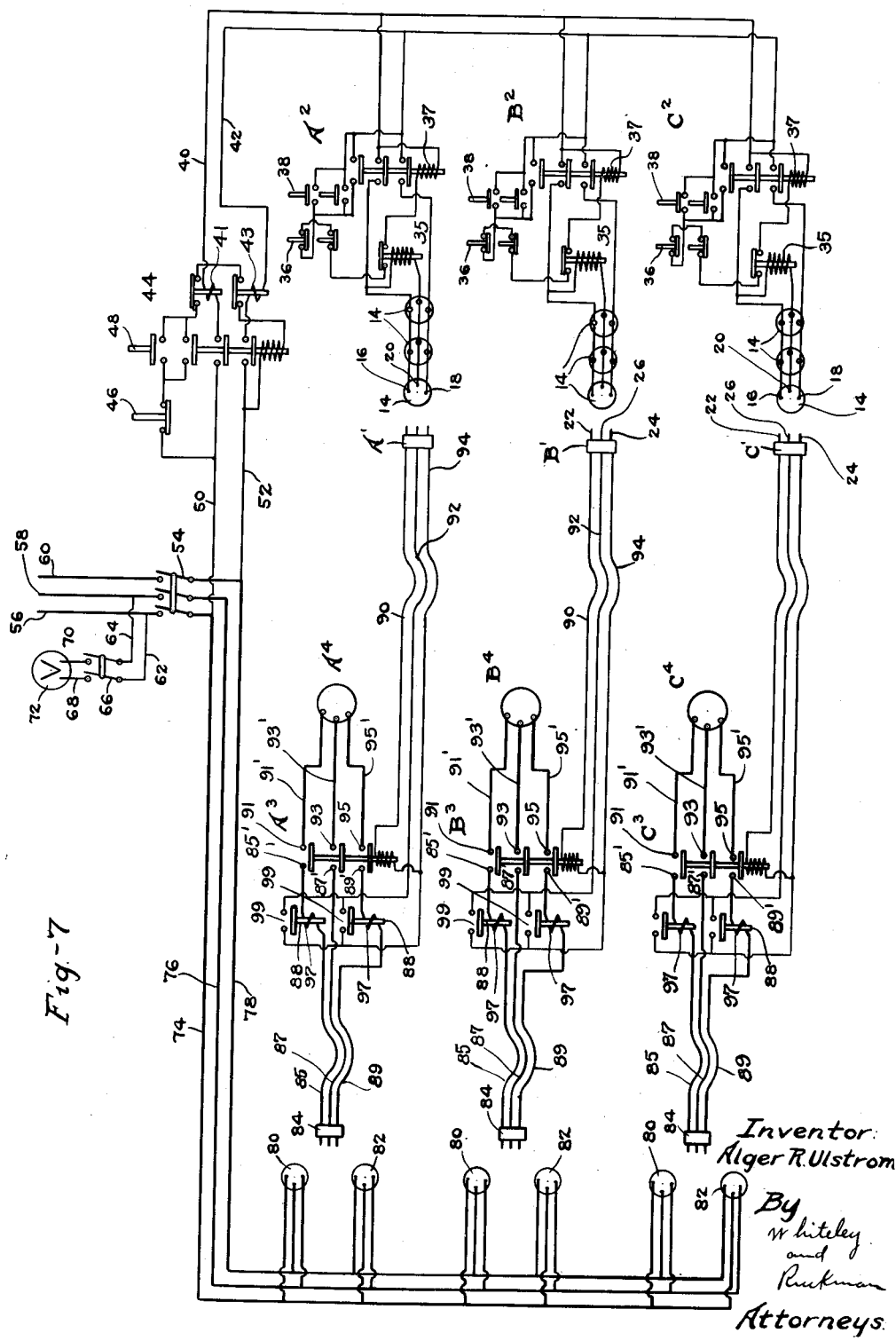

Fig. 1 is an elevational view of the left hand portion of the switch board. Fig. 2 is an elevational view of the right hand portion of the switch board. Fig. 3 is an elevational view on an enlarged scale of a portion of the switch board shown in Fig. 2. Fig. 4 is a view in section on the line 4—4 of Fig. 3. Fig. 5 is a view of one of the overload indicators. Fig. 6 is a plan view showing an arrangement of conveyors which is adapted for operation in connection with my control system. Fig. 7 is a view showing a wiring diagram.

Referring to the particular embodiment of the invention shown in Figs. 1, 2 and 3, the switch board of the system comprises a framework made of structural iron having vertical bars 10 and horizontal bars 12 secured together, the righthand portion of the switchboard in the form shown carrying five control busses A, B, C, D and E' and there being five contact receptacles designated in general by the numeral 14 in connection with each control bus as shown in Fig. 2. It will, of course, be understood that the number of control busses and the number of receptacles in each of the busses may be varied according to the arrangement and extent of the mechanisms which it is desired to control and hence, in the wiring diagram shown in Fig. 7, the principle of operation is shown in connection with three busses. There are three wires in each bus control to which three contacts 16, 18 and 20 carried by each contact receptacle 14 are respectively connected. Selector plugs A', B', C', D', and E' are provided for use in connection with the contact receptacles 14 and for this purpose each plug has three contacts 22, 24, and 26 adapted to cooperate respectively with the contacts 16, 18 and 20. It will be understood that the selector plugs are connected to a ground and each of the contacts 22, 24 and 26 has a wire connected thereto which will be referred to later. The wires which connect with the plugs are enclosed in flexible insulating conduits 28 as shown in Fig. 3. Cables 30 attached at one end to the plugs run over pulleys 32 while counterweights 34 are secured to the other ends of the cables as shown in Fig. 4. The three wires of each of the control busses A, B, C, D, and E are connected respectively with relays $A^2$, $B^2$, $C^2$, $D^2$, and $E^2$, having operative windings 35 and 37, these relays having the well known construction indicated in Fig. 7 and hence not described in detail. Included in the circuits for each of these relays respectively are stop buttons 36 and start buttons 38. The relays just referred to are connected by wires 40 and 42 having windings 41 and 43 with a master relay 44 of well known construction and having a circuit in which are placed a stop button 46 and a start button 48, these two buttons being located in a main control station. The relay 44 is connected by wires 50 and 52 with a main switch 54. Three line wires 56, 58 and 60 are connected with the switch 54. With the main switch open, no current flows to any part of the switch board except through two wires 62 and 64 connected to the line terminals of a volt meter switch 66. When the switch 66 is closed, current flows through the switch contacts and the overload coils and through wires 68 and 70 to a volt meter 72 which registers the voltage on the line. The switch 66 is normally left closed to show whether or not the line to the switch board is live. The circuit used for the volt meter is single phase. When the main switch 54 is closed, current flows through the switch contacts and the overload coils just referred to and through three wires 74, 76 and 78 to 3-pole receptacles which may be of well known construction and which are arranged in pairs designated as 80 and 82 respectively at the lefthand of each motor switch on the lefthand side of the switchboard. The motor switches just referred to are designated in general as $A^3$, $B^3$, $C^3$, $D^3$, and $E^3$. Plugs 84 having three poles connected by wires 85, 87 and 89 to terminals 85', 87' and 89' on one side of these switches are employed. It will be understood that a fourth wire will be used to connect these plugs to a ground. These four wires for each plug 84 are formed into flexible cables 86 as shown in Fig. 1 so that the plug may be readily inserted into either the upper receptacle 80 or the lower receptacle 82. By again referring to Fig. 7 it will be noted that the wires 74 and 78 are connected to the terminals of the lower receptacle of each pair in reverse order from what they are in regard to the upper receptacles so that the motor will be run in reverse directions according to which receptacle of the pair is plugged into. The terminals 91, 93 and 95 at the other side of the motor switches are connected respectively by wires 91', 93', and 95' with motors $A^4$, $B^4$, $C^4$, $D^4$, and $E^4$. The current flows from the terminals connected with the plugs 84 to the terminals 85' and 89' connected with the motors through the wires 85 and 89 which include overload coils 97 having cores 88. The windings of these coils is of the proper rating for the running protection of the particular motor with which the coil is associated. For instance, the winding may be such that if the current in the load side of the switch to the control bus relays exceeds six amperes, the solenoid cores will be lifted with relation to the gaps 99 between the wires 92 and 94. It may be stated at this place that the three contacts 22, 24 and 26 carried respectively by each of the selector plugs A', etc., are connected by wires 90, 92 and 94 with the motor switches $A^3$, etc., in a manner which will be understood by reference to Fig. 7. The construction of an indicating device will be understood in connection with Fig. 5 from which it will be seen that the solenoid cores 88 are attached to a pivoted cross bar 96 which is connected by a push rod 98 with one end of a rockable rod 100, the other end of which carries a trigger 102. This trigger is adapted when in normal position to engage a catch 104 attached to a pivoted plate 106. When the rod 100 is rocked by energization of the solenoids, the catch 104 is released and a spring 108 causes the plate 106 to drop into the dotted line position shown so that this plate constitutes an overload indicator. It will be understood that only the switch for the motor which has been overloaded will have its overload indicator released, although all motor switches connected with that particular control bus will be opened. As soon as the cause of overload has been removed, the overload indicator can be reset by hand and the motors again started by pressing the start button as at first. Failure to reset the overload indicator does not render the overload relay inoperative since this relay is automatically reset when the overload disappears.

The operation and advantages of my invention will be understood in connection with the foregoing description. The switchboard shown for illustrative purposes is designed for operation on 440 volts, 3 phase, 60 cycle alternating current, and the control circuits are preferably of the same voltage so that the trouble usually occasioned by using a different voltage requiring a transformer and the necessary protecting devices is eliminated. When a motor becomes overloaded, the energization of the coils of the cores 88 does two things,—first, it closes a circuit which operates the associated relay on the control bus, thus opening up the operating coil on the relay and releasing the operating coils on all of the motor switches connected to that particular control bus and shutting down the associated motors. Second, it operates the trigger 102 which releases the overload indicator or "telltale" 106. In order to make the operation of the device clear, it will be explained in connection with the conveyor system shown in Fig. 6 in which the conveyors $A^5$, etc., are operated respectively by the motors $A^4$, etc. In order to conveniently start and stop the conveyors, I propose to place a number of stop and start buttons at suitable places along each conveyor. There will preferably be a pair of the buttons located at the unloading end of the conveyor since this is apt to afford a convenient place of control. It will be understood that similar buttons are placed for use in connection with the other conveyors. If it is assumed that packages are to be carried on the conveyor D⁵ from the south end to the north end thereof, the conveyor must travel north and hence, as shown in Fig. 1, the 3-pole plug 84 attached to the switch D³ is placed in the receptacle marked N on the left side of this switch. The selector plug D' is placed in any one of the receptacles on the control bus D. The operator then presses one of the start buttons in order to start the conveyor. The current flows through the terminals of the relay D² to the holding-in coil and to the terminal on the line side of the relay, thus energizing the holding-in coil and closing the contactors of the relay. Current then flows from No. 1 contact through a flexible lead to contact No. 2 to which is connected a wire going to the control station, thereby leaving the holding-in coil energized as long as the stop buttons are all in the circuit. Also current runs through the contactor on the control bus relay to the terminals on the receptacles carried by the bus D and through the wire 90 of the selector plug circuit to No. 2 terminal on the switch D³. Here the current divides, part going to the contacts on the over-load relay and part going to the holding-in coil thereof and coming back through No. 3 terminal over the wire 94 of the selector plug circuit, through the corresponding terminal of the control bus receptacle to the terminal on the load side of the control bus relay, thereby completing the circuit and energizing the holding-in coil for operating the conveyor. The motor switch D³ is closed and this starts the motor D⁴. In order to stop the conveyor D⁵, any stop button associated with the control bus D may be depressed, thereby de-energizing the holding-in coil on the switch D³ and opening the contactors on the motor circuit. If the motor becomes overloaded from any cause, the excess current in the solenoids associated with the switch D³ pulls up the solenoid cores and this closes the circuit on the contacts and sends current from the wire 90 through terminal No. 2 to terminal No. 1 and through the wire 92 of the selector plug circuit and through the coil of the relay D² to terminal No. 4 on the load side of the relay, thereby energizing the coil and lifting the solenoid core which opens the circuit of the wire connected to No. 3 terminal and de-energizing the coil which opens the relay D² and in turn de-energizes the holding-in coil of the switch D⁴. When the overload relay operates, it releases the overload indicator 106. The foregoing explanation relates to the operation of one conveyor or other driven mechanism independently of the remainder. Each conveyor or mechanism can be operated in similar manner at the same time, using a different control bus for each conveyor so that the operation of any one conveyor is not connected with the operation of any other conveyor. In order to operate two or more conveyors together, as a unit, the selector plugs for such conveyors must be placed in receptacles carried by a single control bus. If, for example, conveyors A⁵, B⁵, and C⁵ are to be operated as a unit and controlled from push buttons associated with the bus control C, the selector plugs A', B', and C' are all placed in receptacles carried by this bus control as shown in Fig. 3. Assuming that packages are to be delivered at the east end of these conveyors, the plugs 84 associated with the switches A³, B³, and C³ are placed in the upper receptacles 80 marked "E" as shown in Fig. 1. The control bus C is used as the common control since the control should be accomplished in connection with the last conveyor C⁵ in the unit from which the unloading occurs. Fig. 3 also shows the conveyors D⁵ and E⁵ adapted for separate and independent operation, the selector plug D' being placed in a receptacle carried by the control bus D while the selector plug E' is placed in a receptacle carried by the control bus E. In order to run these two conveyors north, the plugs 84 associated with the switches D³ and E³ are placed in the upper receptacles 80 marked N as shown in Fig. 1.

From the foregoing, it will be understood that the control busses and associated instrumentalities are so arranged that any combination of conveyors or other mechanisms, both independently and in series can be operated and each motor will be adequately protected from injury due to overload. Also breakage of packages and mechanism injury due to overload are eliminated. Although this control system has been designed more particularly for use in connection with a plurality of conveyors, it is obvious that it can be applied to any layout where motors for driving machines are to be operated independently with independent control or together as a group with one control or with partly dependent and partly independent control. Running protection for each individual motor is maintained at all times regardless of the hook-up required. This capability also protects material which is being operated upon in the machines driven by motors and which machines have certain cycles of operation each dependent upon one another, the entire machine being stopped whenever an overload occurs in any part, thus preventing jamming of material and overloading of other parts. On account of the manner in which certain parts of the device are grounded, there are no exposed live parts on the switch board and at the same time the various members are secured directly thereto, only one piece of slate panel being used and this one being for the mounting of the volt meter. All wires except flexible multi-conductor control leads are enclosed in rigid conduits and condulets. The switchboard is, therefore, dustproof and accident proof. For application to interconnected conveyor systems, the motor circuits and the circuits which control the motor switches are intended to be controlled by oil-break electric remote control switches. For conveyor systems, the control relays are intended to be operated by means of push button stations several in a group and connected together and placed along the conveyor at points where loading into cars is done. These stations are so wired that pressing the start button at any one of the stations of a group starts all conveyors operated by the motors connected to the bus which this group of stations controls. Pressing the stop button at any one of these stations causes all of the conveyors associated with this group to be stopped. Locking the stop button locks out the relay which then cannot be operated by pressing a start button as long as the stop button continues to be locked out.

I claim:

1. In an electrical control system, the combination of a plurality of mechanisms, motors for driving said mechanisms, and selective means whereby said motors may be operated dependently in groups and independently of the motors outside of the group.

2. In an electrical control system, the combination of a plurality of mechanisms, motors for driving said mechanisms, and selective means whereby said motors may be operated dependently in groups and independently of the motors outside of the group, said selective means including automatic means for stopping all the motors of the group when any one of the motors included therein becomes overloaded.

3. In an electrical control system, the combination of a plurality of mechanisms, motors adapted to drive said mechanisms independently and separately, and selective means whereby any number of said motors may be dependently controlled for driving said mechanisms.

4. In an electrical control system, the combination of a plurality of mechanisms, motors adapted to drive said mechanisms independently and separately, selective means whereby any number of said motors may be dependently controlled for driving said mechanisms, and reversing devices whereby each of said motors may be rotated in either direction independently of the direction of rotation of the other motors.

5. In an electrical control system, the combination of a plurality of mechanisms, motors for driving said mechanisms, a plurality of control busses corresponding respectively with said motors, line wires having connection with said busses, a plurality of contact devices connected with each of said busses, a plurality of selector plugs each of which is adapted to be engaged with different contact devices of the busses, and connections between said selector plugs and said motors.

6. In an electrical control system, the combination of a plurality of mechanisms, motors for driving said mechanisms, a plurality of control busses corresponding respectively with said motors, line wires having connection with said busses, a plurality of contact devices connected with each of said busses, a plurality of selector plugs each of which is adapted to be engaged with different contact devices of the busses, connections between said selector plugs and said motors, and stop and start devices for said motors adjacent said mechanisms.

7. In an electrical control system, the combination of a plurality of mechanisms, motors for driving said mechanisms, motor switches, line wires having connection with said switches, a plurality of control busses, a plurality of contact devices connected with each of said busses, a plurality of selector plugs each of which is adapted to be engaged with any one of said contact devices, and connections associated with said plugs for operating said switches when said plugs are engaged with said contact devices.

8. In an electrical control system, the combination of a plurality of mechanisms, motors for driving said mechanisms, a plurality of control busses, a plurality of contact devices connected with each of said busses, a plurality of control relays with which said busses are respectively connected, line wires having connection with said relays, motor switches with one side of which said line wires have connection, said motors being connected to the other side of said switches respectively, a plurality of selector plugs, each of which is adapted to be engaged with any one of said bus contact devices, and connections between said control relays and said switches respectively which open the switch of any motor which has become overloaded.

9. In an electrical control system, the combination of a plurality of mechanisms, motors for driving said mechanisms, a plurality of control busses, a plurality of contact devices connected with each of said busses, a plurality of control relays with which said busses are respectively connected, line wires having connection with said relays, motor switches with one side of which said line wires have connection, said motors being connected to the other side of said switches respectively, "holding in" coils associated respectively with said switches, a plurality of selector plugs each of which is adapted to be engaged with any one of said bus contact devices, and connections between said selector plugs and the "holding in" coils of said motor switches respectively.

10. In an electrical control system, the combination of a plurality of mechanisms, motors for driving said mechanisms, a plurality of control busses, a plurality of contact devices connected with each of said busses, a plurality of control relays with which said busses are respectively connected, line wires having connection with said relays, a plurality of contact devices with which said line wires are connected, contact plugs adapted to be engaged respectively with said contact devices, motor switches to one side of which said contact plugs are respectively connected, said motors being connected to the other side of said switches respectively, "holding in" coils associated respectively with said switches, a plurality of selector plugs each of which is adapted to be engaged with any one of said bus contact devices, and connections between said selector plugs and the "holding in" coils of said motor switches respectively.

11. In an electrical control system, the combination of a plurality of mechanisms, motors for driving said mechanisms, a plurality of control busses, a plurality of contact devices connected with each of said busses, a plurality of control relays with which said busses are respectively connected, line wires having connection with said relays, a plurality of pairs of contact devices with which said line wires are connected, the two devices of each pair being reversely connected, contact plugs adapted to be engaged respectively with either one of said pairs of contact devices, motor switches to one side of which said contact plugs are respectively connected, said motor being connected to the other side of said switches respectively, "holding in" coils associated respectively with said switches, a plurality of selector plugs each of which is adapted to be engaged with any one of said bus contact devices, and connections between said selector plugs and the "holding in" coils of said motor switches respectively.

12. In an electrical control system, the combination of a plurality of mechanisms, motors for driving said mechanisms, a plurality of control busses, a plurality of contact devices connected with each of said busses, a plurality of control relays with which said busses are respectively connected, line wires having connection with said relays, a plurality of pairs of contact devices with which said line wires are connected, the two devices of each pair being reversely connected, contact plugs adapted to be engaged respectively with either one of said pairs of contact devices, motor switches to one side of which said contact plugs are respectively connected, said motors being connected to the other side of said switches respectively, overload coils and "holding in" coils associated respectively with said switches, a plurality of selector plugs each of which is adapted to be engaged with any one of said bus contact devices, and connections between said selector plugs and the overload and "holding in" coils of said motor switches respectively.

13. In an electrical control system, the combination of a plurality of mechanisms, motors for driving said mechanisms, a plurality of control busses, a plurality of contact receptacles connected with each of said busses, a plurality of control relays with which said busses are respectively connected, a master relay with which said control relays are connected, a main switch with which said master relay is connected, line wires connected to one side of said main switch, a plurality of pairs of contact receptacles with which the other side of said main switch is connected the two receptacles of each pair being reversely connected with said main switch, contact plugs adapted to be engaged respectively with either one of said pairs of receptacles, motor switches to one side of which said contact plugs are respectively connected, said motor being connected to the other side of said switches respectively, over-load coils and "holding in" coils associated respectively with said switches, a plurality of selector plugs each of which is adapted to be engaged with any one of said bus receptacles, and connections between said selector plugs and the overload and "holding in" coils of said motor switches respectively.

14. In an electrical control system, the combination of a plurality of mechanisms, motors for driving said mechanisms, independent electromagnetic means for connecting each of said motors to a common source of power, a control circuit for each of said electromagnetic means, and means for selectively grouping said control circuits whereby the corresponding motors may be simultaneously controlled.

In testimony whereof I hereunto affix my signature.

ALGER R. ULSTROM.